United States Patent [19]
Karbhari et al.

[11] Patent Number: 5,866,215
[45] Date of Patent: Feb. 2, 1999

[54] COMPOSITE COMPONENTS HAVING FELT REINFORCEMENT AND METHOD FOR THE MANUFACTURE THEREOF

[75] Inventors: Vistasp M. Karbhari, Carlsbad, Calif.; Thomas R. McDermott, Franklin, Mass.

[73] Assignees: The Regents of the University of California, Oakland, Calif.; Clark-Cutler-McDermott, Franklin, Mass.

[21] Appl. No.: 641,052

[22] Filed: Apr. 29, 1996

[51] Int. Cl.⁶ .............. B32B 1/08; B32B 1/10; B32B 5/26; B32B 27/04
[52] U.S. Cl. .............. 428/36.1; 264/257; 264/258; 264/324; 428/36.2; 428/36.91; 428/162; 428/167; 428/172; 428/179; 428/182; 428/184; 442/320; 442/321; 442/323; 442/324; 442/326; 280/748
[58] Field of Search ............... 264/257, 258, 264/324; 428/36.1, 36.2, 36.91, 162, 167, 172, 179, 182, 184; 442/326, 320, 321, 323, 324

[56] References Cited

U.S. PATENT DOCUMENTS

| | | | |
|---|---|---|---|
| 3,850,723 | 11/1974 | Ackley | 156/180 |
| 4,258,093 | 3/1981 | Benedyk | 156/148 |
| 4,568,581 | 2/1986 | Peoples | 428/35 |
| 4,830,900 | 5/1989 | Sumij et al. | 428/195 |
| 4,851,274 | 7/1989 | D'Elia | 428/113 |
| 5,108,826 | 4/1992 | Fujiki | 428/212 |
| 5,217,654 | 6/1993 | Buckley | 264/324 |
| 5,217,799 | 6/1993 | Sumii et al. | 428/280 |
| 5,296,065 | 3/1994 | Greatorex | 156/196 |

*Primary Examiner*—James C. Cannon
*Attorney, Agent, or Firm*—Wolf, Greenfield & Sacks, P.C.

[57] ABSTRACT

A composite component is provided having at least one felt layer as reinforcement when used for crash and/or noise management applications, and preferably also including at least one reinforcement fiber layer. At least one of the reinforcement layers, preferably a felt layer, may be formed into a preform which is placed into a mold of suitable shape to form the component, along with the other reinforcement layers, with a resin/polymer being injected into the mold and then cured to form the composite component.

21 Claims, 4 Drawing Sheets

COMPOSITE COMPONENTS HAVING FELT REINFORCEMENT AND METHOD FOR THE MANUFACTURE THEREOF

FIELD OF THE INVENTION

This invention relates to composite components and more particularly to composite components having layers of both felt and fiber as reinforcement, to the use of felt reinforced composites for crash management and to methods for the manufacture of such composites.

BACKGROUND OF THE INVENTION

Composites fabricated of one or more layers of a woven or nonwoven fiber reinforcing a polymer matrix have found wide application in space, aeronautic, and other applications where the high strength-to-weight and stiffness-to-weight ratios of composites, along with their corrosion resistance and overall durability, offset the significantly higher cost of such materials over various metals such as steel and aluminum. However, since to achieve optimum performance in applications of composite components such as automobile bumpers or other components used for crash management, multiple layers of expensive reinforcing fabric, formed for example from glass or carbon fibers, are currently utilized, use for such applications has been very limited. In particular, while such use can result in components which are significantly lighter, permitting the vehicle on which they are utilized to achieve better gas mileage, have better corrosion resistance properties and greater durability than the comparable steel or aluminum components, and are at least as effective for crash management purposes, the automobile industry has been unwilling to incur the cost penalty in switching to such components.

A need therefore exists for a composite which can provide components with good crash management properties and which substantially retains the other advantageous properties of high performance composites, including desired strength-to-weight and stiffness-to-weight ratios, as well as corrosion resistance and overall durability, while permitting the cost of the composite to be significantly reduced so as to make the use of such composites more attractive for use in crash management and other components. Costs would be further reduced, and the ecological corrections of the product improved, if at least some of the reinforcement could be provided by "waste" and/or recycled materials.

SUMMARY OF THE INVENTION

In accordance with the above, it has been found that the crash management characteristics of a composite are not adversely affected, and may in fact be enhanced, if one or more layers of the composite's reinforcing fibers are replaced by a layer(s) of nonwoven "needle" felt material (hereinafter generally referred to as "felt material" or "felt"). The felt material is preferably molded or otherwise shaped into a preform which is in the shape of at least a portion of the composite component. The felt layer or preform preferably constitutes roughly a quarter to a third of the reinforcement or fill for the composite, and may, depending on application and the felt used, constitute even more of the reinforcement (possibly replacing most if not all of the fiber reinforcement in some applications). Thus, there would typically be two or three layers of fiber with a single layer of felt in a given section of the composite component; however, this is not a limitation on the invention, nor is it essential that all sections of the component have the same ratio of fiber and felt layers. Thus, in some applications, felt may be cut and pieced in only selected sections of the component or, more likely, one or more layers of the fiber may be cut and pieced in selected sections to achieve desired crash management or other characteristics. Further, where there are two or more layers of fiber for a given layer of felt, it may be preferable that two of the fiber layers sandwich the felt layer, and for at least some crash management applications, it is preferable that there be at least one fiber layer outside of the felt layer for components which have an inner and outer surface. For preferred embodiments, it is also desirable that the felt layer or preform be macroscopically homogeneous, and that it be formed of substantially homogeneous fibers since this provides uniform wetting of the felt by the polymer. However, in applications with for example less stringent specifications, this may not be required, and good results can also be achieved even with felt layers formed of waste or recycled materials. To facilitate forming the felt layer into a preform, it is also desirable that this layer be formed of thermoplastic fibers, but again, this is not essential. It is also possible, particularly where reinforcing layers are primarily felt layers, for reinforcing fibers of, for example, carbon or Kevlar to be incorporated into the felt layer to add strength thereto.

For some embodiments of the invention, there are at least two felt preforms, each of which forms a selected portion of the component's shape, with the preforms being mounted adjacent to each other to form the selected shape. For a particular embodiment, the selected shape is a plurality of adjacent tubes with each pair of adjacent tubes having a flange therebetween. For this embodiment, the preforms are preferably of the same shape, each having raised and lowered sections, with corresponding lowered sections being adjacent to form the flanges, and spaced corresponding raised sections forming the tubes. However, as will be discussed in greater details later, many other component shapes are possible in practicing the teachings of the inventions, and the shape utilized will depend on the requirements of the particular application.

To fabricate a composite component for a preferred embodiment of this invention, a layer of the nonwoven felt material and at least one layer of the fibers are positioned adjacent to each other in a mold having substantially the shape of the component. A polymer is then injected or otherwise loaded into the mold to fill and encapsulate the felt and fiber layers. The resulting composite component may then be removed from the mold. Depending on the polymer used, a curing step is performed before the component is removed from the mold and may also be performed after the component is removed from the mold. Before the layers are positioned in the mold, it is preferable that the felt layer be shaped into a preform having substantially the shape of at least a portion of the selected component, with the preform being positioned in the mold and the at least one layer of fibers being positioned adjacent to and conforming to the form of the preform. During the positioning of the layers in the mold, at least one of the felt layers or the fiber layers may be cut and pieced so as to be positioned in only a portion of the mold. For the embodiment where adjacent tubes are being formed separated by flanges, the two preforms are positioned in the mold with corresponding lowered sections being adjacent to form the flanges, and with corresponding raised sections being spaced, with mandrels therebetween, to form the tubes. When the component is removed from the mold, the mandrels are also removed.

The foregoing and other objects, features and advantages of the invention will be apparent in the following more particular description of preferred embodiments of the invention as illustrated in the accompanying drawings.

IN THE DRAWINGS

FIGS. 3(a)–3(i) are perspective views of illustrative crash management components which may be formed utilizing the teachings of this invention.

Figure 4:
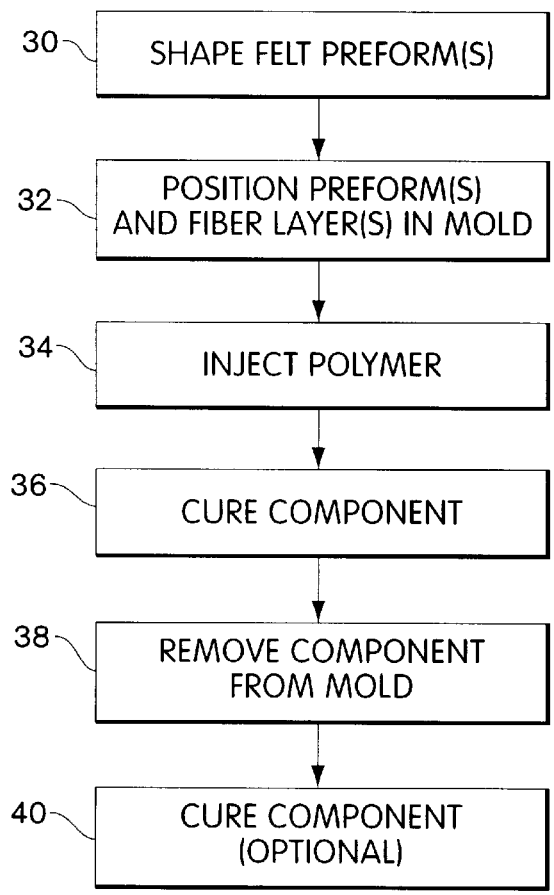

FIG. 4 is a flow diagram of a process for forming a composite component in accordance with the teachings of this invention.

DETAILED DESCRIPTION

Figure 1:
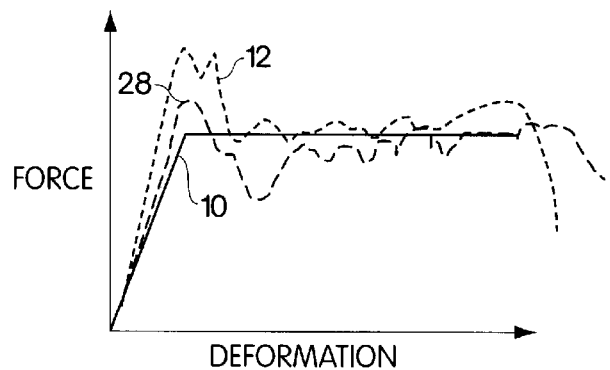
FIG. 1 is a diagram illustrating the ideal force deformation characteristic for a crash management component and the force deformation characteristics for a composite component with and without a felt layer substituted for one or more fiber layers.

Referring to FIG. 1, curve 10, the solid line curve, illustrates the ideal force/deformation profile for crash management applications. Thus, the structure or component experiences little, if any, deformation until a threshold force is reached, such as that which would occur in a crash, and the component then deforms significantly at the given force level to absorb the energy of the crash, thereby protecting selected protected areas, such as the engine compartment and cab of a vehicle, from damage and protecting occupants of such a cab from injury. While metals achieve the desired characteristic through ductile behavior, composites typically achieve such characteristic by brittle behavior through a sequence of controlled damage characteristics. Thus, while metal structures collapse by buckling and folding in accordion-like fashion, composites fail through a sequence of fracture mechanisms that include fiber failure, matrix crazing and cracking, fiber-matrix debonding, kinking and delamination. Line 12 of FIG. 1 illustrates an exemplary characteristic with a tube structure such as that shown in FIG. 3(a) where a composite using only multiple fiber layers is employed. It is seen that this structure has relatively high initial strength so that it does not begin deformation until a relatively high force is reached, but then experiences significantly uneven deformation with force, with a significant drop from the force at which deformation originally occurred.

Figure 2:
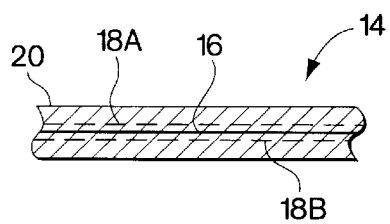
FIG. 2 is a sectional diagram of a composite component in accordance with the teachings of this invention.

FIG. 2 illustrates the composite structure for an illustrative embodiment 14 of the invention. For this structure, a layer or preform 16 of a nonwoven needle felt material is sandwiched between a pair of layers 18A and 18B of woven or nonwoven fibers of the type typically used in composites. The layers 16 and 18 are filled and encapsulated by a polymer 20 of the type normally used for composites, for example a polyester or a phenolic polymer. Since needle felts are formed of randomly oriented, relatively short fibers, these felts are macroscopically homogenous (i.e. have substantially the same characteristics in all directions). Such felts may be formed of a variety of materials including cotton and wool strands, fiberglass strands and strands of various synthetic material, may be formed of virgin, waste or reclaimed (recycled) materials, and may be formed of threads or strands of a variety of different materials. While depending on application, many of these felts could be utilized, it may be preferable that pure or virgin fibers be used and that the fibers be substantially homogeneous so as to be uniformly wetted by the polymer. Further, since as will be discussed later, it is preferable that the felt layer be molded or otherwise shaped into a preform which substantially conforms to the shape of at least a portion of the component being fabricated, it is preferable that the fibers utilized, or at least a portion of such fibers, be thermoplastic fibers, such as polyester fibers which can be heat and/or cold formed under pressure into the desired shape. The thickness of the felt layer 16 is preferably at least 3 mils in order to achieve the desired characteristics. However, none of the above are limitations on the invention, and good results can be achieved with a variety of waste, recycled and/or non-homogeneous materials.

The fiber layers 18 can be formed of a variety of materials currently used for composites. Fiber layers suitable for crash management include carbon fibers, glass fibers, and certain artificial fibers such as nylon. Other natural or artificial fibers might also be used for forming the layers 18, depending on application and desired characteristics. It is also within the contemplation of the invention that the fiber layers be formed of a combination of materials, and it is possible that the fiber layers 18A and 18B may be formed of different fibers. However, for a preferred embodiment, only a single fiber is used for each layer 18.

While in FIG. 2, fiber layers 18A and 18B are shown as sandwiching felt layer 16, and this is the preferred configuration, it is not a limitation on the invention. Further, while it is believed preferable, at least for crash management applications, for roughly two thirds to three quarters of the fill to be fiber layers, with the remainder of the fill being felt, this is also not a limitation on the invention and the invention could for example be practiced with a single fiber layer and a single felt layer or, for certain applications, even with only felt reinforcement. In the later case, carbon fibers, Kevlar fibers or like reinforcing fibers could be included in forming the felt. Where there are two or more fiber layers, they could, for some applications, all be on the same side of the felt layer, although again, this is not the currently preferred configuration. Finally, where the component or structure 14 has an inside surface, as for example the structure in FIG. 3(a), to the extent the felt layer is not sandwiched by the fiber layers, it is preferable that the felt layer be on the inside and the fiber layers on the outside. To the extent there are more than two fiber layers, the extra fiber layer(s) would preferably be on the outside of the structure in such applications.

Figure 3A:
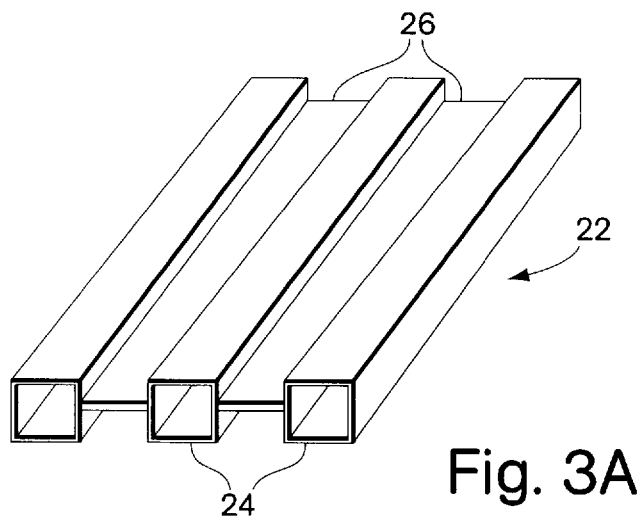

FIGS. 3(a)–3(i) show various illustrative structures which may be/have been used for crash management applications, with various ones of the structures being advantageous for different applications. FIG. 3(a) shows an array 22 of elongated tubes 24 which are preferably square and which tubes are interconnected by flanges 26, the flanges serving as stabilizing elements during crush. Assemblies such as that shown in FIG. 3(a) can be used for crash management, for example, by serving as crash rails connecting a fender or bumper to the rest of the structure. As indicated previously, line 12 in FIG. 1 is a forced/deformation profile for a configuration such as that shown in FIG. 3(a) which is formed of a composite having only fiber layers. Line 28 in FIG. 1 is a forced/deformation profile for the same configuration formed of a composite having a felt layer replacing at least one of the fiber layers. It is seen that this profile is comparable to that provided by the more expensive all fiber composite and in fact more closely tracks the ideal curve 10. One reason for this may be that while fiber layers provide strength, they may not always have good energy damping properties. Conversely, while felt layers do not have comparable strength, they can have excellent energy absorbing characteristics when appropriate constituents are chosen. The use of the fibers and felt in the composite therefore utilizes the advantages of both layers to achieve good crash management characteristics at significantly reduced cost.

Ideally, when a structure such as that shown in FIG. 3(a) deforms in a crash, the tubes will peal back like a banana peel, with the felt layers shearing and forming a "debris wedge" rather than tearing.

Figure 3B:
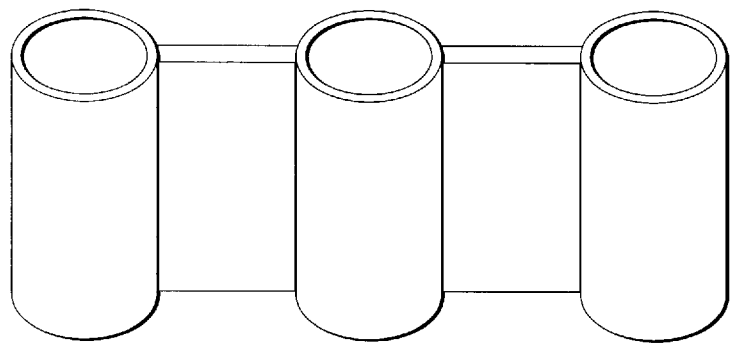

FIGS. 3(b)–3(i) show additional structures which have been or which may be used for crash management and for which the teachings of this invention may be utilized. For example, the structure of the FIG. 3(b) is similar to that of FIG. 3(a) except that rather than the tubes having a basically square cross-section, cylindrical tubes are utilized.

Figure 3C:
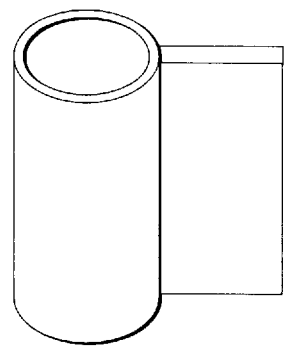
Figure 3D:
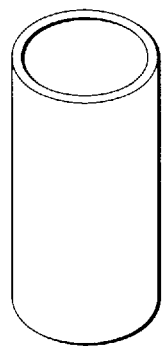
Figure 3E:
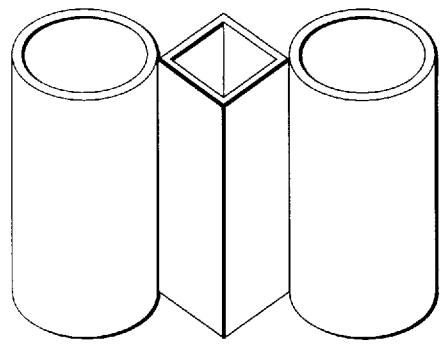
Figure 3F:
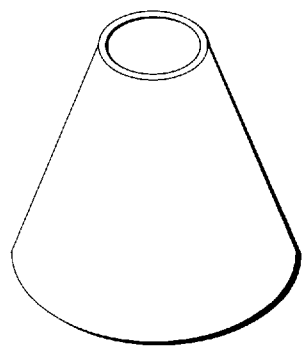
Figure 3G:
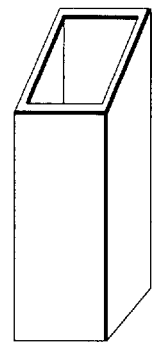
Figure 3H:
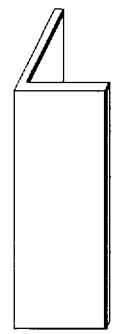
Figure 3I:

FIG. 3(c) has only a single cylindrical tube and a single flange rather than a plurality of tubes and flanges, while FIG. 3(d) has only a single cylindrical tube and FIG. 3(i) has only half a cylindrical tube. FIG. 3(e) shows a structure having a pair of cylindrical tubes interconnected by a square tube. Other possible structures include a frustrated cone shape as shown in FIG. 3(f), a tube with an angular cut top surface which is shown as a square tube in FIG. 3(g), but could also be a cylindrical tube, and a half-square tube as shown in FIG. 3(h). These structures may be utilized in selected crash management applications where such structures may be advantageous over that shown in FIG. 3(a). However, the structures shown in FIGS. 3(a)–3(i) are only illustrative of available crash management structures and other structures suitable for crash management applications are within the contemplation of the invention.

FIG. 4 is a flow diagram of a method which may be utilized in fabricating a composite component in accordance with the teachings of this invention. The first step, step 30, is to shape one or more felt preforms 16. This may be accomplished by shaping the felt layer under heat and pressure in a suitable tool or by cold forming the felt layer under pressure in a suitable tool. Techniques for making such preforms are known in the art. A felt layer formed of a thermoplastic fiber may be better suited for such preform procedures. For some applications, step 30 would not be preformed and the felt layer would be used without being preformed.

During step 32, the next step in the operation, the preform and the fiber layer or layers are positioned in a suitable mold. In some applications, two or more preforms may be laid adjacent to each other in a suitable mold to construct the desired component shape. For example, to fabricate the component shown in FIG. 3(a), a first preform can be laid in the mold, preferably over one or more fabric layers, one or more fabric layers could if desired then be laid over the preform and a mandrel in the shape of the openings in each tube fitted in the openings in each preform, thus shaping any fiber layers over the preform to the shape of the preform. Additional fiber layer(s) could then be laid over the mandrel and the second preform positioned over the mandrels (and fiber layer(s) if present), with the flanges of the two preforms adjacent each other. One or more additional fiber layers could then be laid over the second preform and shaped to conform therewith with the other half of the mold then being positioned over these components and the mold closed.

For other types of components, the fiber layer(s) could be positioned in a mold in ways known in the art with the felt layer or preform being positioned adjacent to the fiber layers or sandwiched therebetween. It is also within the contemplation of the invention for some applications, for the felt layer 16 and/or one or more of the fiber layers to be cut and pieced during step 32 so as to appear in only part of the component. For example, a felt layer 16 could appear only in the flanges of a structure such as that shown in FIG. 3(a). This can be used to achieve a component having selected characteristics.

Once step 32 has been completed, the operation proceeds to step 34 to inject or otherwise load a suitable polymer into the mold in manners known in the art. Phenolic, polyester, or other polymer resins known in the art could be used for this purpose.

From step 34 the operation proceeds to step 36 to cure the component in the mold and then to step 38 to open the mold and remove the component therefrom. Depending on the polymer utilized, curing step 40 may also be performed on the component after it is removed from the mold, either by air curing or by other suitable curing techniques known in the art.

In the discussion above, it has been assumed that only the felt layers are shaped into preforms. However, preforms, which are cores and/or inserts for the structures which form the desired shape prior to the injection or infusion of resin/polymer, may be of a fabric layer, felt layer or combinations of two or more reinforcement layers.

Further, while the invention has been described above primarily with respect to components for crash management, it should be understood that other properties of felt materials, such as their sound damping properties, may also be utilized in certain composite components which are fabricated in accordance with the teachings in this invention. For example, components of the type described herein could be mounted behind structural members in, for example, auto-doors or ceilings for noise reduction, a molded component being easier to assemble than loose felt and offering other potential advantages. In fact, one of the great advantages of composites in general is their tailorability. Since the components of this invention have two different types of reinforcement layers which may be varied to achieve selected characteristics, the composites of this invention are highly tailorable, permitting components to be fabricated having a wide range of characteristics to accommodate the requirements of many diverse applications. Therefore, while the invention includes crash management components and noise management components utilizing a felt reinforced composite, the invention is not to be limited to such components, but is intended to also include any composite components having both fiber and felt reinforcement layers. Thus, while the invention has been particularly shown and described above with reference to preferred embodiments, the foregoing and other changes in form and detail may be made therein by one skilled in the art without departing from the spirit and scope of the invention.

What is claimed is:

1. A composite component comprising:
   at least one layer of a nonwoven needle felt material;
   at least one layer of fibers for each of said felt layers, each layer of fibers being adjacent to the corresponding felt layer; and
   a polymer filling and encapsulating both the at least one felt layer and the at least one layer of fibers.

2. A composite component as claimed in claim 1 wherein each felt layer is a preform, and wherein each layer of fibers conforms to the shape of the corresponding preform.

3. A composite component as claimed in claim 2 wherein said composite component has a selected shape; and
   wherein there are two of said preforms, each of which is in the form of a selected portion of said shape, said preforms being mounted adjacent each other to form said selected shape.

4. A composite component as claimed in claim 1 wherein there is a single layer of fibers for each layer of felt material.

5. A composite component as claimed in claim 1 wherein there are at least two layers of fibers for each layer of felt material.

6. A composite component as claimed in claim 5 wherein two of said layers of fibers sandwich the corresponding layer of felt material.

7. A composite component as claimed in claim 1 wherein said composite component has a single layer of felt material.

8. A composite component as claimed in claim 1 wherein at least one of said at least one felt layers or fiber layers is cut and pieced so as to fill only a portion of said composite component.

9. A composite component as claimed in claim 1 wherein each of said at least one felt layers is macroscopically homogeneous and is formed of substantially homogeneous fibers.

10. A composite component as claimed in claim 1 wherein the fibers for said at least one felt layer include thermoplastic fibers.

11. A composite component as claimed in claim 1 wherein there are approximately two to three fiber layers for each felt layer.

12. A method for fabricating a composite component having a selected shape comprising the steps of:
   a) positioning a layer of a nonwoven needle felt material and at least one layer of fibers adjacent each other in a mold having substantially said selected shape;
   b) loading a polymer into the mold to fill and encapsulate said layers; and
   c) removing the resulting composite component from the mold.

13. A method as claimed in claim 12 including the step performed at least before step (c) of curing the composite component.

14. A method as claimed in claim 12 wherein there are at least two layers of fibers which layers are positioned in said mold to sandwich the preform.

15. A method as claimed in claim 12 including the step performed before step (a) of shaping said felt layer into a preform having a shape which is substantially the same as at least a portion of said selected shape, the preform being positioned in said mold with the at least one layer of fibers adjacent to and conforming to the form of the preform.

16. A method as claimed in claim 15 wherein there are at least two of said preforms, each of which is in the form of a selected portion of said shape, and wherein said preforms are mounted adjacent each other in said mold during step (a) to form said selected shape.

17. A method as claimed in claim 16 wherein said selected shape is a plurality of adjacent tubes, with each pair of adjacent tubes having a flange therebetween, and wherein the preforms are of the same shape, having raised and lowered sections; and wherein during step (a) the preforms are positioned in the mold with corresponding lowered sections being adjacent to form the flanges and with corresponding raised section being spaced, with mandrels therebetween, to form said tubes.

18. A method as claimed in claim 12 wherein, during step (a), at least one of said felt layers or fiber layers is cut and pieced so as to be positioned in only a portion of said mold.

19. A composite component for crash or noise management comprising:
   at least one preform layer of a nonwoven needle felt material shaped to correspond to at least a portion of the component's shape; and
   a polymer filling and encapsulating the at least one felt layer.

20. A component as claimed in claim 19 wherein said at least one felt preform layer includes fibers of a reinforcing material.

21. A component as claimed in claim 19 including at least one layer of fibers for each of said felt layers, each layer of fibers being adjacent to the corresponding felt layer; and
   wherein the polymer fills and encapsulates both the at least one felt layer and the at least one layer of fibers.

* * * * *